(12) United States Patent
Smith

(10) Patent No.: US 8,918,975 B2
(45) Date of Patent: Dec. 30, 2014

(54) APPARATUS AND METHOD FOR FACILITATING BLADDER REMOVAL

(75) Inventor: Steven L. Smith, Jacksonville, FL (US)

(73) Assignee: Stemit Enterprises, LLC, Jacksonville, FL (US)

(*) Notice: Subject to any disclaimer, the term of this patent is extended or adjusted under 35 U.S.C. 154(b) by 446 days.

(21) Appl. No.: 13/457,975

(22) Filed: Apr. 27, 2012

(65) Prior Publication Data

US 2012/0272497 A1 Nov. 1, 2012

Related U.S. Application Data

(60) Provisional application No. 61/480,169, filed on Apr. 28, 2011.

(51) Int. Cl.
| | |
|---|---|
| *B23P 11/00* | (2006.01) |
| *B23P 19/04* | (2006.01) |
| *B64D 37/04* | (2006.01) |
| *B64F 5/00* | (2006.01) |
| *B25B 27/00* | (2006.01) |

(52) U.S. Cl.
CPC ............. *B64D 37/04* (2013.01); *B25B 27/00* (2013.01); *B64F 5/0036* (2013.01); *B64F 5/009* (2013.01)
USPC ............ 29/402.03; 29/426.1; 29/270; 29/284

(58) Field of Classification Search
CPC ...... B25B 27/00; B64D 37/04; B65D 90/046; B64F 5/0045; B64F 5/009; B64F 5/0081
USPC .......... 29/402.03, 426.1, 700, 244, 270, 271, 29/281.6, 284; 220/564, 567.2, 4.15, 9.4, 220/495.05, 905, FOR. 115
See application file for complete search history.

(56) References Cited

U.S. PATENT DOCUMENTS

| | | | |
|---|---|---|---|
| 3,067,810 A | 12/1962 | Mozic | |
| 3,095,066 A * | 6/1963 | Abplanalp, Jr. | 188/295 |
| 6,260,544 B1 | 7/2001 | Spry | |
| 6,327,990 B1 * | 12/2001 | Crifase et al. | 114/219 |
| 2004/0173494 A1 | 9/2004 | Elstone | |
| 2008/0272116 A1 | 11/2008 | Martucci | |
| 2009/0188109 A1 | 7/2009 | Bampton | |

FOREIGN PATENT DOCUMENTS

KR 10-2007-0062203 6/2007

OTHER PUBLICATIONS

PCT International Searching Authority: "International Search Report and Written Opinion", dated Nov. 12, 2010, entire document.

* cited by examiner

*Primary Examiner* — Jermie Cozart
(74) *Attorney, Agent, or Firm* — Allen, Dyer, Doppelt, Milbrath & Gilchrist

(57) ABSTRACT

An apparatus for facilitating fluid bladder removal from a support structure through an access opening includes a frame defining a central opening dimensioned to conform to the access opening, the frame having opposed first and second surfaces and adapted to removably mount inside the support structure around the access opening, and a plurality of roller assemblies mounted to the first surface around the central opening. The apparatus is connected inside the support structure with the rollers extending away from and surrounding the access opening to facilitate passage of the fluid bladder.

20 Claims, 3 Drawing Sheets

APPARATUS AND METHOD FOR FACILITATING BLADDER REMOVAL

CROSS-REFERENCE TO RELATED APPLICATION

This application claims the benefit of U.S. Provisional Application Ser. No. 61/480,169, filed on Apr. 28, 2011, the contents of which are herein incorporated by reference in their entirety.

FIELD OF THE INVENTION

The present invention relates to the removal and re-installation or replacement of flexible fluid storage bladders from within support structures, and more particularly, to the removal and re-installation or replacement of airplane fuel bladders.

BACKGROUND OF THE INVENTION

Flexible storage bladders are used in various applications to provide a fluid tight storage volume within another structure designed to support the bladder. One example is the use of fuel bladders on airplanes, where one or more fluid bladders are located within the wings and/or fuselage of the airplane.

To ensure fluid-tightness and integrity, fluid bladders are typically removed from within their corresponding support structures for periodic inspections. If the fluid bladder is still intact and in acceptable condition, it is then re-installed; if not, the fluid bladder must be repaired or replaced.

For removal, the fluid bladder is typically emptied and any connection points (such as fluid plumbing fittings or the like) between the fluid bladder and the surrounding structure are disconnected. The fluid bladder is then withdrawn through an access opening in the structure.

During such removals, there is a significant risk of damaging the fluid bladder through interaction between the bladder and sharp surfaces at or around the access opening. The costs associated with the otherwise unnecessary repair or replacement of fuel bladders due to damage during removal can quickly become considerable.

SUMMARY OF THE INVENTION

In view of the foregoing, it is an object of the present invention to provide an apparatus and method for facilitating fluid bladder removal. According to an embodiment of the present invention, an apparatus for facilitating fluid bladder removal from a support structure through an access opening includes a frame defining a central opening dimensioned to conform to the access opening, the frame having opposed first and second surfaces and adapted to removably mount inside the support structure around the access opening, and a plurality of roller assemblies mounted to the first surface around the central opening. According to a method aspect, the apparatus is connected inside the support structure with the rollers extending away from and surrounding the access opening to facilitate passage of the fluid bladder.

These and other objects, aspects and advantages of the present invention will be appreciated in view of the drawings and following description of a preferred embodiment.

DETAILED DESCRIPTION OF A PREFERRED EMBODIMENT

Figure 1:
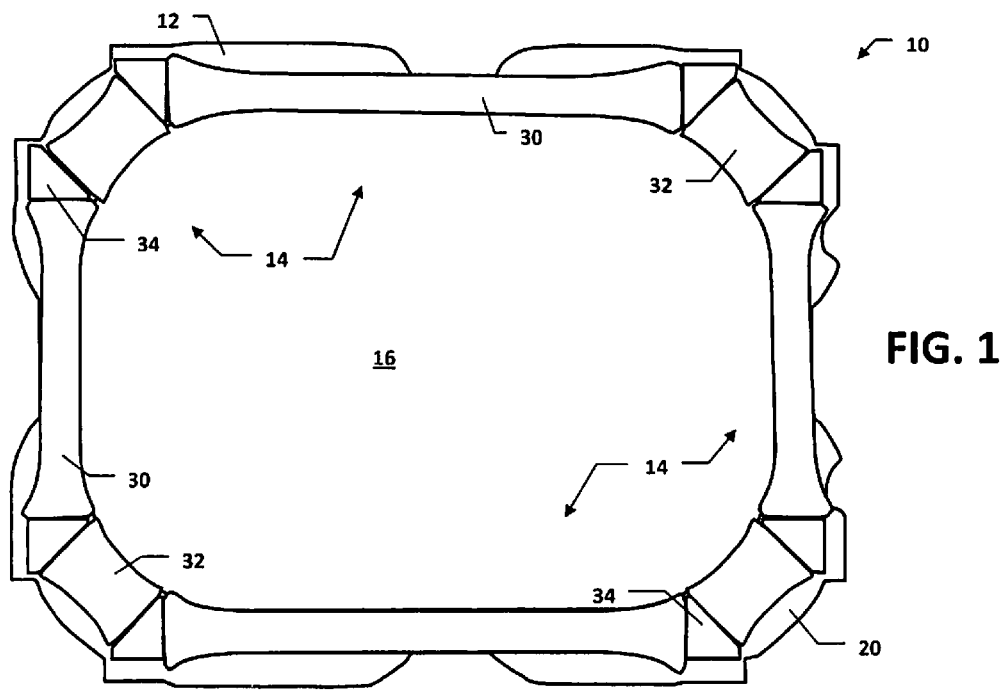
FIG. 1 is a bottom view of an apparatus for facilitating fuel bladder removal, according to an embodiment of the present invention.
Figure 2:
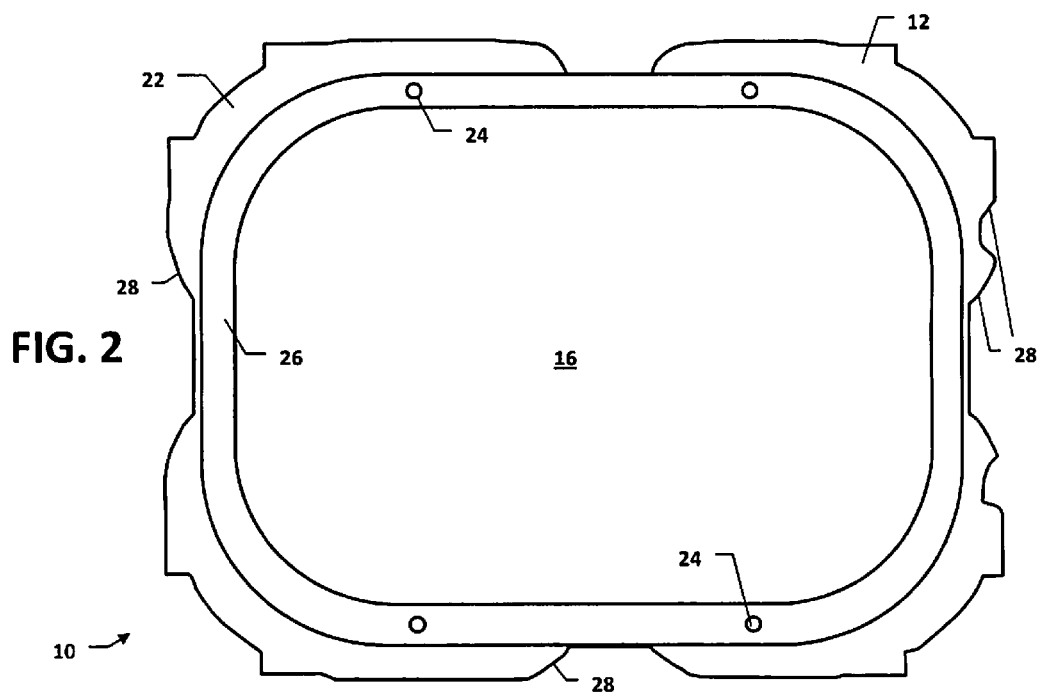
FIG. 2 is a top view of the apparatus of FIG. 1.
Figure 3:
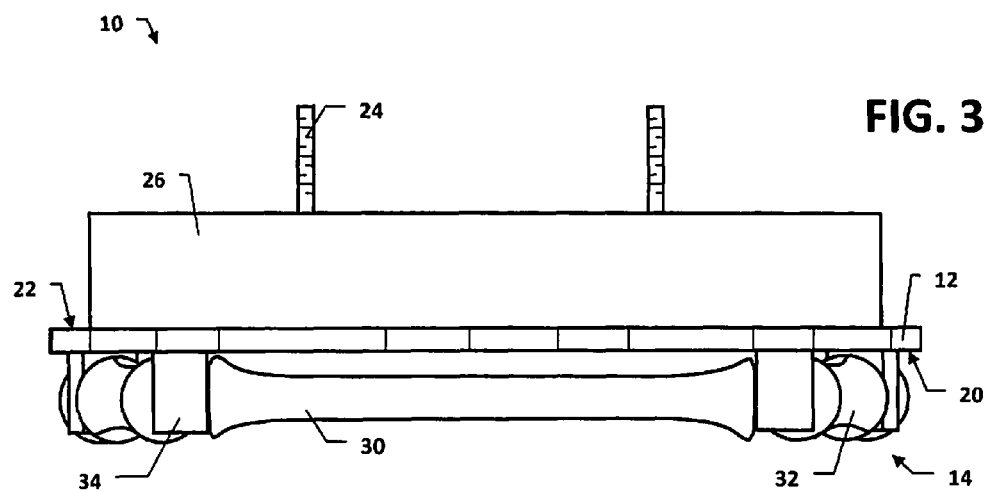
FIG. 3 is a side view of the apparatus of FIG. 1.

Referring to FIGS. 1-3, an apparatus 10 for facilitating fluid bladder removal includes a frame 12 with a plurality of roller assemblies 14 mounted thereto. The frame 12 defines a central opening 16 that is dimensioned to closely conform to the shape of an access opening of a support structure from which a fuel bladder will be removed. The plurality of roller assemblies 14 substantially surround the central opening 16 and are rotatable to facilitate the passage of the fuel bladder therethrough.

The frame 12 includes a first surface 20 and a generally opposed second surface 22. The roller assemblies 14 are mounted to the first surface 20 and bolts 24 or other connectors extend away from the second surface 22 to facilitate connection within the access opening. Many structures holding fluid bladders will have various structural elements arranged along inside surfaces thereof, such as stringers, struts and the like. A spacer 26 extends away from the second surface 22 to eliminate interference between the roller assemblies 14 and any such structural elements. Likewise, to ensure the frame 12 does not interfere with such structural elements, accommodation notches 28 can be formed along a periphery of the frame 12.

The number and design of notches 28, as well as the overall dimensions of the frame 12 and spacer 26 can vary depending on the support structure and fuel bladder for which the apparatus 10 is designed. Exemplary thicknesses for the frame and spacer include ¼ inch and 2 inches, respectively. Aluminum construction is advantageous for lightness and durability. In the depicted embodiment, the frame 12 and spacer 26 are separate structures, held together by the bolts 24 which extend from the second surface 22 of the frame 12 and through the spacer 26. Countersunk nuts (not shown) can be used to hold the spacer 26 to the frame 12 while still permitting the spacer to fit flush against the support structure around the insider of the access opening. Alternately, an integral frame and spacer could be used.

The roller assemblies 14 include two pairs of generally opposed side rollers 30 and two pairs of corner rollers 32 arranged between ends of the side rollers 30. The rollers in each opposed pair 30 are mounted along generally parallel axes of rotation, with the rotational axis of each side roller 30 being generally perpendicular to the adjacent side roller 30. The axes of rotation of the corner rollers 32 are offset approximately 45 degrees from each axes of rotation of its adjacent side rollers 30. The roller assemblies 14 each include mounting mechanisms 34 for rotational connection to the frame 12, with the mounting mechanisms 34 connected to the first surface 20.

The present invention is not necessarily limited to the depicted frame 12 shape, or roller assembly 14 mounting locations. It will be appreciated that the dimensions of the frame 12 and opening 16 can be adapted depending on the access opening in connection with which the apparatus 10 is intended for use. Similarly, the number and configurations of the roller assemblies 14 can also be modified. Advantageously, the rollers 30, 32 are shaped so that their inner peripheries collectively conform very closely to the shape of the central opening 16, and likewise to the opening in the rigid structure, and are aligned therewith.

Figure 4:
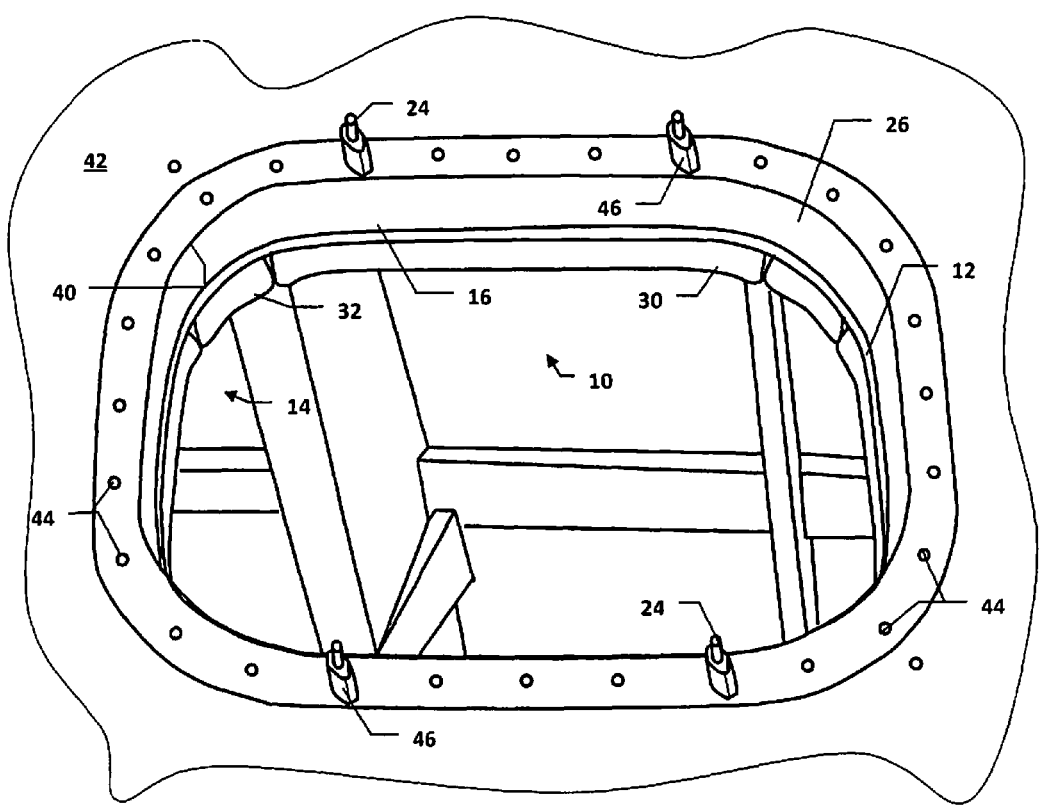
FIG. 4 is a perspective view of the apparatus of FIG. 1, installed inside an access opening of a support structure.

Referring to FIG. 4, the apparatus 10 is connected inside the access opening 40 of a support structure 42, such as an airplane wing or fuselage. A plurality of bores 44 extends around the opening 40, which bores 44 are utilized to connect the opening 40 with the bladder and/or an access cover during normal use. The bolts 24 on the second surface 22 of the frame 12 are inserted through some of these bores 44, with which they are aligned, and secured with nuts 46. The apparatus 10 is thereby securely held around the inner side of the access opening 40, with the central opening 16 of the frame aligned therewith.

Figure 5:
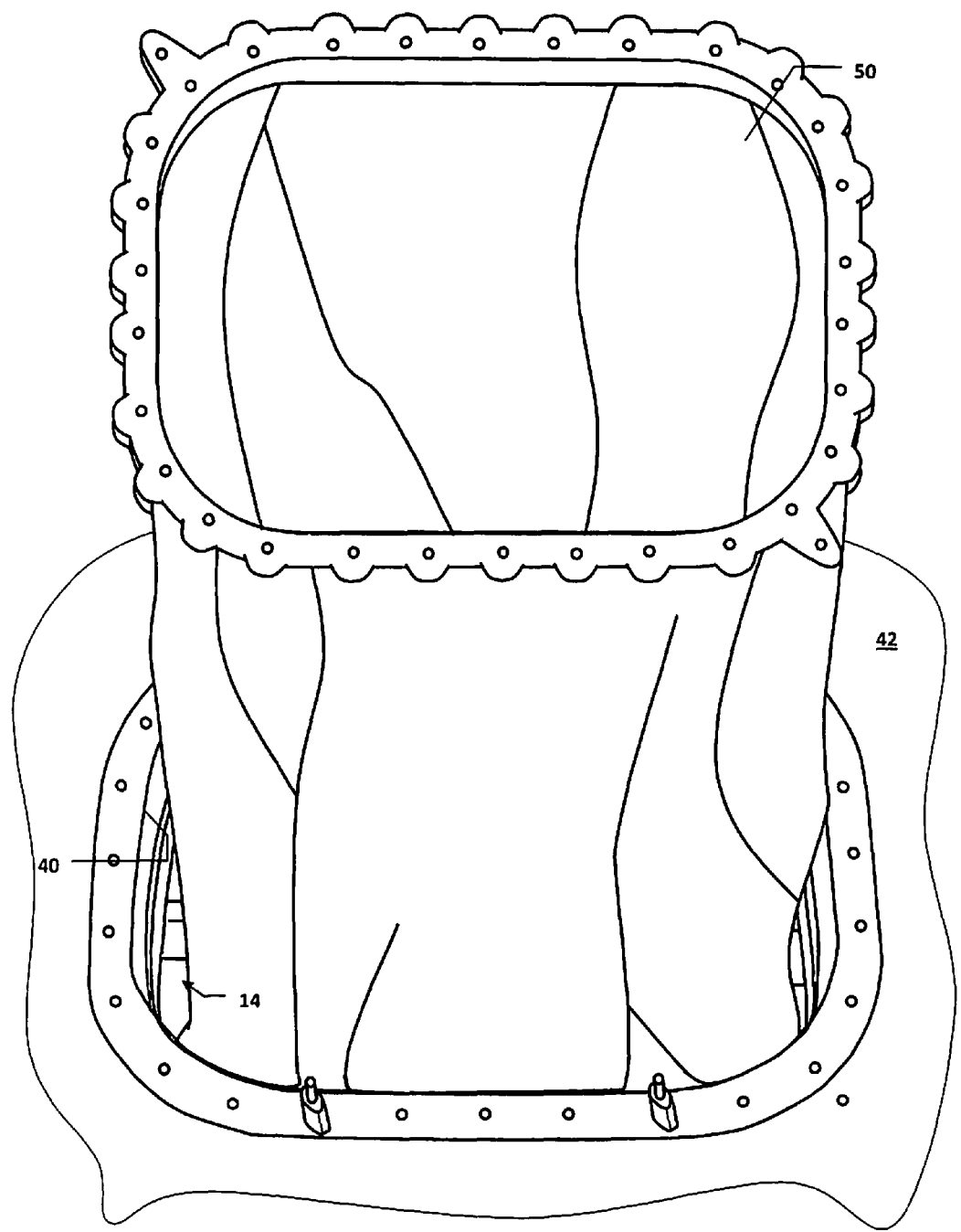
FIG. 5 is a perspective view of the apparatus of FIG. 1 in use during removal of a fuel bladder from the support structure of FIG. 4.

Referring to FIG. 5, the roller assemblies 14 effectively smooth the transition of a fluid bladder 50, such as a fuel bladder, when passing out of (or back into) the structure 42 through the opening 40. It has been determined that use of the apparatus 10 greatly facilitates the removal of the bladder 50 through the access opening 40, both speeding up the process of removal and minimizing the risk of damage to the bladder.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An apparatus for facilitating fluid bladder removal from a support structure through an access opening, the apparatus comprising:
   a frame defining a central opening dimensioned to conform to the access opening, the frame having opposed first and second surfaces and adapted to removably mount inside the support structure around the access opening; and
   a plurality of roller assemblies mounted to the first surface around the central opening, such that the plurality of roller assemblies facilitate the passage of the fluid bladder through the access opening.

2. The apparatus of claim 1, further comprising a spacer extending from the second surface surrounding from the central opening.

3. The apparatus of claim 1, further comprising a plurality of bolts extending from the second surface and positioned to align with bores in the support structure surrounding the access opening.

4. The apparatus of claim 1, wherein at least one accommodation notch is defined along a periphery of the frame, the accommodation notch preventing interference with an internal structural element of the support structure.

5. The apparatus of claim 1, wherein the plurality of roller assemblies includes at least two opposed pairs of side rollers surrounding the opening.

6. The apparatus of claim 5, wherein the plurality of roller assemblies further includes at least two pairs of corner rollers, each corner roller being arranged between adjacent side rollers.

7. The apparatus of claim 5, wherein the rollers are shaped such inner peripheries thereof closely conform to the central opening.

8. A method of facilitating fluid bladder removal from a support structure through an access opening, the method comprising:
   connecting an apparatus inside the access opening, the apparatus having a frame and a plurality of roller assemblies extending around a central opening thereof, the apparatus being connected with the plurality of roller assemblies extending away from the access opening;
   removing the fluid bladder through the plurality of roller assemblies, the central opening and the access opening.

9. The method of claim 8, wherein connecting the apparatus inside the access opening includes connecting the apparatus with a spacer extending between the frame and the access opening.

10. The method of claim 8, wherein connecting the apparatus inside the access opening includes inserting a plurality of bolts from the apparatus through openings in the support structure around the access opening.

11. The method of claim 10, wherein connecting the apparatus inside the access opening further includes attaching a plurality of nuts to the plurality of bolts outside the access opening.

12. The method of claim 8, wherein connecting the apparatus inside the access opening includes connecting the apparatus with at least two opposed pairs of side rollers surrounding the access opening.

13. The method of claim 12, wherein connecting the apparatus inside the access opening includes connecting the apparatus with at least two pairs of corner rollers, each corner roller being located between adjacent side rollers.

14. The method of claim 12, wherein connecting the apparatus inside the access includes connecting the apparatus with a shape of inner peripheries of rollers of the roller assemblies conforming to the central opening and the access opening.

15. The method of claim 8, wherein the support structure is part of an aircraft and the fluid bladder is a fuel bladder for the aircraft.

16. An apparatus for facilitating fluid bladder removal from a support structure through an access opening, the apparatus comprising:
   a frame defining a central opening dimensioned to conform to the access opening, the frame having opposed first and second surfaces and adapted to removably mount inside the support structure around the access opening;
   a plurality of roller assemblies mounted to the first surface around the central opening, such that the plurality of roller assemblies facilitate the passage of the fluid bladder through the access opening, the plurality of roller assemblies including at least two pairs of opposed side rollers and at least two pairs of corner rollers surrounding the central opening, the corner rollers being located between adjacent side rollers, inner peripheries of the side and corner rollers collectively conforming to the central opening; and
   a plurality of connectors extending from the second surface and positioned to align with bores in the support structure around the access opening.

17. The apparatus of claim 16, further comprising a spacer extending from the second surface surrounding the central opening, the plurality of connectors extending away from the spacer.

18. The apparatus of claim 17, wherein the spacer is thicker than the frame.

19. The apparatus of claim 16, wherein the plurality of connectors are bolts.

20. The apparatus of claim 16, wherein at least one accommodation notch is defined along a periphery of the frame, the accommodation notch preventing interference with an internal structural element of the support structure.

* * * * *